Patented June 15, 1926.

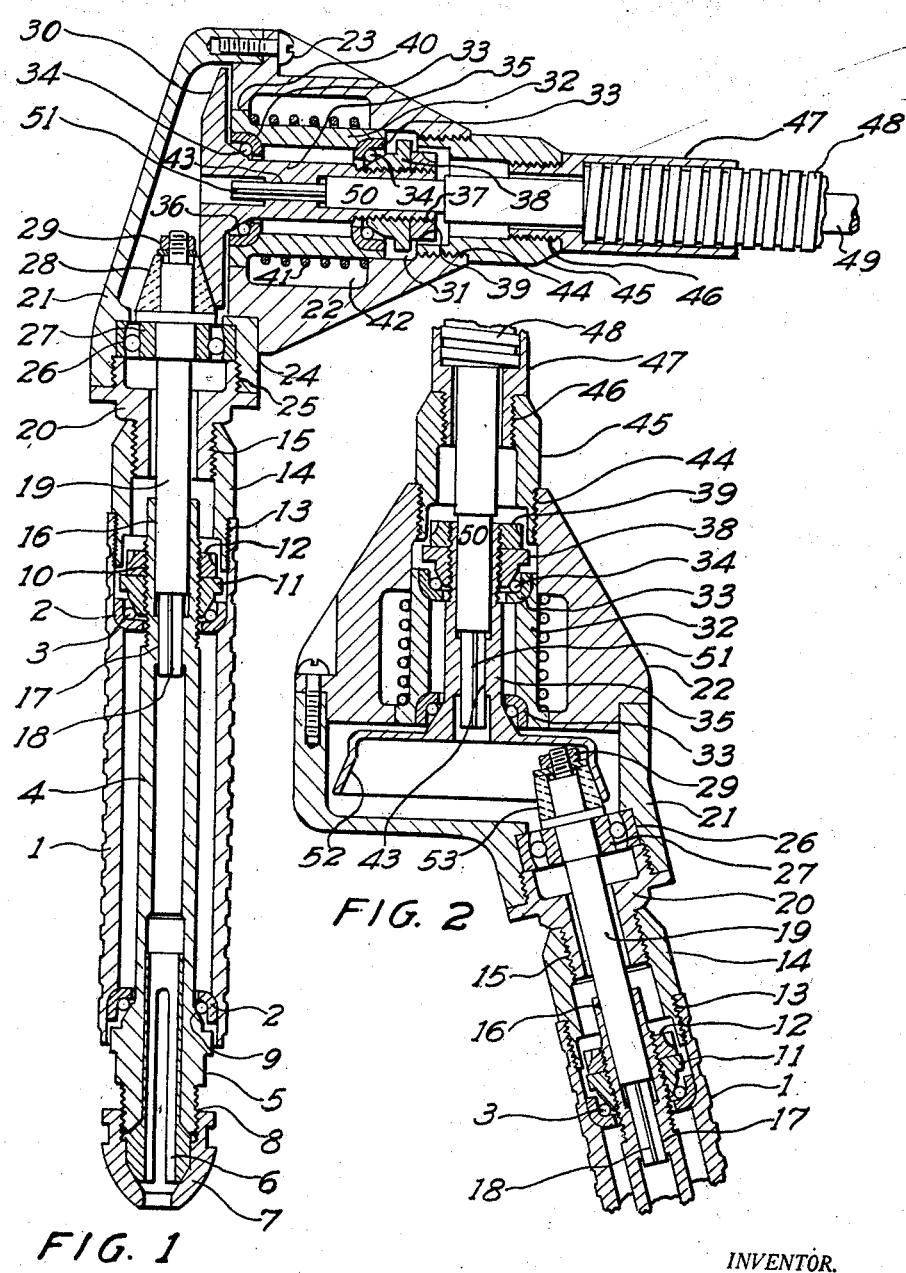

1,588,839

UNITED STATES PATENT OFFICE.

JOSEPH F. KELLER, OF NEW YORK, AND ALWIN B. BACHMANN, OF BROOKLYN, NEW YORK, ASSIGNORS TO KELLER MECHANICAL ENGINEERING CORPORATION, OF BROOKLYN, NEW YORK, A CORPORATION OF NEW YORK.

FLEXIBLE SHAFT HANDPIECE.

Application filed September 25, 1923. Serial No. 664,684.

Our invention relates more particularly to a flexible shaft hand piece for holding burrs or grinding wheels operated by a flexible shaft bench grinder or the like, and to a high speed attachment, adapted to be operated in connection therewith.

Various types of hand pieces are well known to the trade and many of these have ball bearings, but it is believed that in our improved hand piece, we have overcome many of the objections of prior hand pieces and in addition have produced a satisfactory ball bearing for the high speed hand piece, which, we believe, is novel. One object of our invention, therefore, has been to make the cylindrical hand piece as compact as possible and this we have accomplished by the compact arrangement of the cup and cone ball bearings, which we have incorporated therein.

In the ordinary hand piece, the flexible shaft is usually connected to the driven element of the hand piece by fins or a fish tail connection, which it is found soon becomes loose by wear and, therefore, a further object of our improvement is to provide a square end on the stud of the flexible shaft, which is adapted to enter a square hole or socket in the end of the shank of the rotatable clutch of the hand piece. This construction allows for longitudinal play and at all times is effective to maintain connection between the flexible shaft and the chuck and it is found in practice that it does not wear so readily.

In using small burrs or grinding wheels, for finishing dies or the like, it is desirable to run the tool at high speed and while this can be done to a limited extent by the ordinary direct connection of the hand piece with the flexible shaft, it is not desirable on account of excessive friction in the flexing of the shaft, to have the flexible shaft run at too high a speed and, therefore, a further object of our improvement is to provide a high speed hand piece, of compact construction, whereby the speed of the tool may be multiplied considerably, while operating the flexible shaft at normal speed. It will be understood that our high speed hand piece may be constructed and used as a single unit or it may be made as an attachment between the flexible shaft and our improved cylindrical hand piece.

Obviously, any ordinary multiplying gear connections can be used but in our high speed hand piece, we have found it desirable to eliminate excessive noise and provide for better operating conditions by utilizing a friction drive of the disc and cone type and to avoid excessive friction and wear, the rotating parts thereof are provided with ball bearings.

In the accompanying drawings, we have shown the preferred form of our improved hand piece; Fig. 1 representing the high speed hand piece, in which the flexible shaft and chuck are at right angles, while in Fig. 2, there is shown a slight modification, in which the flexible shaft and chuck are nearly in axial alignment, this being accomplished by utilizing an internal friction drive.

Referring to the drawings and more particularly to Fig. 1, it will be seen that our improved hand piece comprises a cylindrical shell or casing 1, counterbored at each end for the insertion of ball bearing cup 2, in which a plurality of balls 3 are located. A tubular shaft 4, forming the shank of a chuck is rotatably mounted in the shell 1, the forward end 5 thereof being enlarged and bored out to accommodate the chuck jaws 6. The clamping nose 7 of the chuck is screw-threaded onto the enlarged head 5, as will be seen at 8. The chuck end of the shaft 4 is provided with an annular cone bearing at 9 for cooperation with the balls 3 at the forward end of the shell 1. The other end of the shank or shaft 4 is threaded at 10 and a cone bearing 11 is mounted thereon for cooperation with the balls 3 at the upper end of the shell 1, substantially as shown in Fig. 1 of the drawings. This provides for the usual adjustment of the ball bearings, and a lock nut 12 is provided for locking the cone bearing 11 in adjusted position. The upper end of the shell 1 is internally threaded at 13 and an annular thimble 14 screwed therein. The thimble 14 is screw-threaded internally at 15 to receive the attachment nipple (20 or 47) of the casing containing the high speed mechanism, or the armor of the flexible shaft.

The tubular shaft 4, which forms the shank of the chuck 5—7, is counter-bored at its upper end, at 16, and is provided with a square socket at 17 for receiving the squared end 18 of a stud shaft 19, which passes freely through the screw threaded attachment nipple 20 of the high speed mechanism, as shown in Fig. 1 of the drawings.

The high speed mechanism is preferably mounted in a casing formed of two parts 21 and 22, held together by suitable screws 23. The casing member 21 is provided with a boss 24, which is bored out and screw threaded at 25 to receive the attachment nipple 20, the latter also serving to hold in place, a ring type ball bearing 26, the inner ring 27, of which is securely mounted upon the stud shaft 19, thereby providing a ball bearing for the latter. The upper end of the stud shaft 19 is provided with a friction cone 28, secured thereto and held in place by a nut 29. A friction disc or wheel 30 is rotatably supported in the casing member 22, so that the friction face thereof is adapted to engage the friction cone 28 and drive the latter at high speed, since the friction disc 30 is of comparatively large diameter. The high speed casing member 22 is bored out at 31 to receive a ball bearing shell or cylinder 32, which, in the present instance, is provided with ball cups 33, cooperating with balls 34. The friction disc or wheel 30 is provided with a shank or stud shaft 35, which has an annular cone bearing at 36 cooperating with the balls 34 of the adjacent ball cup 33. The opposite end of the stud shaft 35 is screw threaded at 37 and carries an adjustable cone bearing 38, which cooperates with the balls 34 of the other ball cup 33, as will be seen in Fig. 1 of the drawings. A lock nut 39 is provided for holding the cone bearing 38 in adjusted position. It will be noticed that this arrangement permits a sliding movement of the cylinder 32 in the casing 22, and this is utilized for maintaining pressure between the friction disc 30 and the friction cone 28 to insure satisfactory friction drive. For this purpose, the cylinder 32 is provided with an annular flange 40, against which a compression spring 41 thrusts, the opposite end engaging the casing 22, which is hollowed out at 42, as shown in Fig. 1.

The shank or stud shaft 35 of the friction disc 30 is bored out or tubular, substantially similar to the tubular shaft 4, forming the shank of the chuck, and is provided with a square socket at 43 of the same size as and corresponding to the square socket 17 in the chuck shank 4. The casing member 22 is bored out and threaded at 44 to receive an annular thimble 45, substantially identical with the thimble 14, which is similarly screw-threaded at 46 to receive the attachment nipple 47 of the armor 48 surrounding the flexible shaft 49. The operating end of the flexible shaft 49 is provided with a stud shaft or connector plug piece 50, the end of which is squared at 51 to fit the square hole or socket 43, so that the flexible shaft may drive the friction disc 30.

The operation of the high speed hand piece will be readily understood from the description and drawings and it will be seen that the flexible shaft 49 may be run at normal speeds, while the shaft 4 and chuck 5—7 will run at much higher speed on account of the interposed multiplying gearing of the friction drive 28—30. The arrangement is such, however, that by unscrewing the attachment nipple 20, the high speed casing and its enclosed mechanism may be removed from the shell 1 of the main hand piece and the screw nipple 47 of the flexible shaft may be screwed into place in the thimble 14 of the hand piece. By so doing, the square end 51 of the stud 50 on the flexible shaft 49 will enter the square socket 17 in the chuck shank 4 of the hand piece, thereby providing for direct drive of the chuck from the flexible shaft. The chuck jaws 6 which, in the present instance, are of the tubular spring chuck type, are preferably removably inserted in the bored out end of the chuck member 5 and are held in place by the clamping nose 7, so that if desired, one set of chuck jaws 6 may be removed at any time by unscrewing the nose 7 and a different set of jaws having a different jaw diameter, inserted therein.

The form of our improved high speed hand piece, as shown in Fig. 2 of the drawings, is substantially the same in construction as that shown in Fig. 1 and the corresponding parts are indicated by the same reference numerals. The main difference is that the axis of the flexible shaft stud 50 is arranged nearly in axial alignment with the axis of the chuck shank 4 in the main hand piece. This is accomplished by substituting an internal friction drive wheel 52 for the disc driving wheel 30 and substituting a conical friction pinion 53, formed with a suitable conical angle for the face thereof to roll on the internal friction surface of the wheel 52, for the small friction cone 28, shown in Fig. 1. This straight line form of our high speed hand piece has some advantages and may be preferred over the right angle construction of Fig. 1 in handling certain types of work. The operation, however, of the two devices is substantially the same.

While we have shown our improved hand piece as more particularly adapted for high speed operation, it will be understood that we do not wish to be limited to the specific construction shown, for the high speed mechanism may be considered as an accessory to the regular equipment and attached to the regular stock hand piece whenever it is desired to operate the tool at high speed, without increasing the speed of the flexible shaft. It will also be understood that various modifications in the specific details of construction may be made without departing from the spirit and scope of the invention.

We claim:—

1. A flexible shaft hand piece, comprising a cylindrical shell and a tubular shaft passing therethrough, and rotatably mounted therein, one end of said tubular shaft being enlarged and formed as a chuck while the other end thereof is adapted to be engaged by the stud end of the flexible shaft.

2. A flexible shaft hand piece, comprising a cylindrical shell, a tubular shaft rotatably mounted therein, said shaft being enlarged at one end and formed as a chuck, the opposite end being provided with a square socket for receiving the stud end of the flexible shaft, and cup and cone ball bearings between said shell and said shaft.

3. A flexible shaft hand piece, comprising a cylindrical shell, a chuck the shank of which is rotatably mounted in said shell, ball bearings between said shell and the chuck shank, a square socket formed in the end of the chuck shank for receiving the squared stud end of the flexible shaft and intermediate high speed gearing between the shaft and said chuck shank.

4. A flexible shaft hand piece, comprising a ball bearing rotatable chuck hand piece, an intermediate high speed gear mechanism attached to said hand piece, means for driving said high speed gearing from the flexible shaft and means for driving said chuck from the high speed gearing.

5. The flexible shaft hand piece as claimed in claim 4, in which the high speed gearing comprises a large friction wheel adapted to be driven by the flexible shaft and a small friction cone driven by said wheel, and means operatively connecting said friction cone with said chuck.

6. A flexible shaft hand piece, comprising a cylindrical shell, a rotatable chuck member mounted therein, a high speed mechanism therefor, provided with a casing removably secured to said shell, including multiplying gear devices within said casing and a high speed stud shaft operated thereby and adapted to engage and drive said chuck and means for driving said high speed gear mechanism from the stud end of said flexible shaft.

7. A flexible shaft hand piece, comprising a casing, a chuck member rotatably mounted in said casing, high speed gearing operatively connected with said chuck member, means operatively connecting said high speed gearing with the stud end of the flexible shaft, and ball bearings between the casing and said high speed mechanism.

8. The flexible shaft hand piece, as claimed in claim 7, in which the high speed mechanism comprises a friction cone driven by friction disc and a spring is provided within the casing for holding the disc in contact with the friction cone.

9. A flexible shaft hand piece, comprising a cylindrical shell, a chuck the shank of which is rotatably mounted on ball bearings in said shell, a casing removably attached to one end of said shell, a high speed stud shaft in said casing to operatively engage and drive said chuck, a friction cone secured to said stud shaft, a friction disc adapted to engage said cone for driving the latter at high speed, ball bearings for rotatably supporting said friction disc in the casing, a spring engaging the casing and thrusting said disc against the cone and means for driving said disc from the flexible shaft.

10. The flexible shaft hand piece, as claimed in claim 9, in which the stud end of the flexible shaft and the end of said high speed stud shaft are provided with similar squared ends and the shank of said chuck and the high speed disc are each provided with similar square sockets, whereby the high speed casing may be removed from said shell and the flexible shaft operatively connected directly to the shank of said chuck.

JOSEPH F. KELLER.
ALWIN B. BACHMANN.